June 4, 1957 S. C. HETH 2,794,438
ADJUSTABLE CONCAVE HAVING SHEAR PIN
Filed June 10, 1954 2 Sheets-Sheet 1
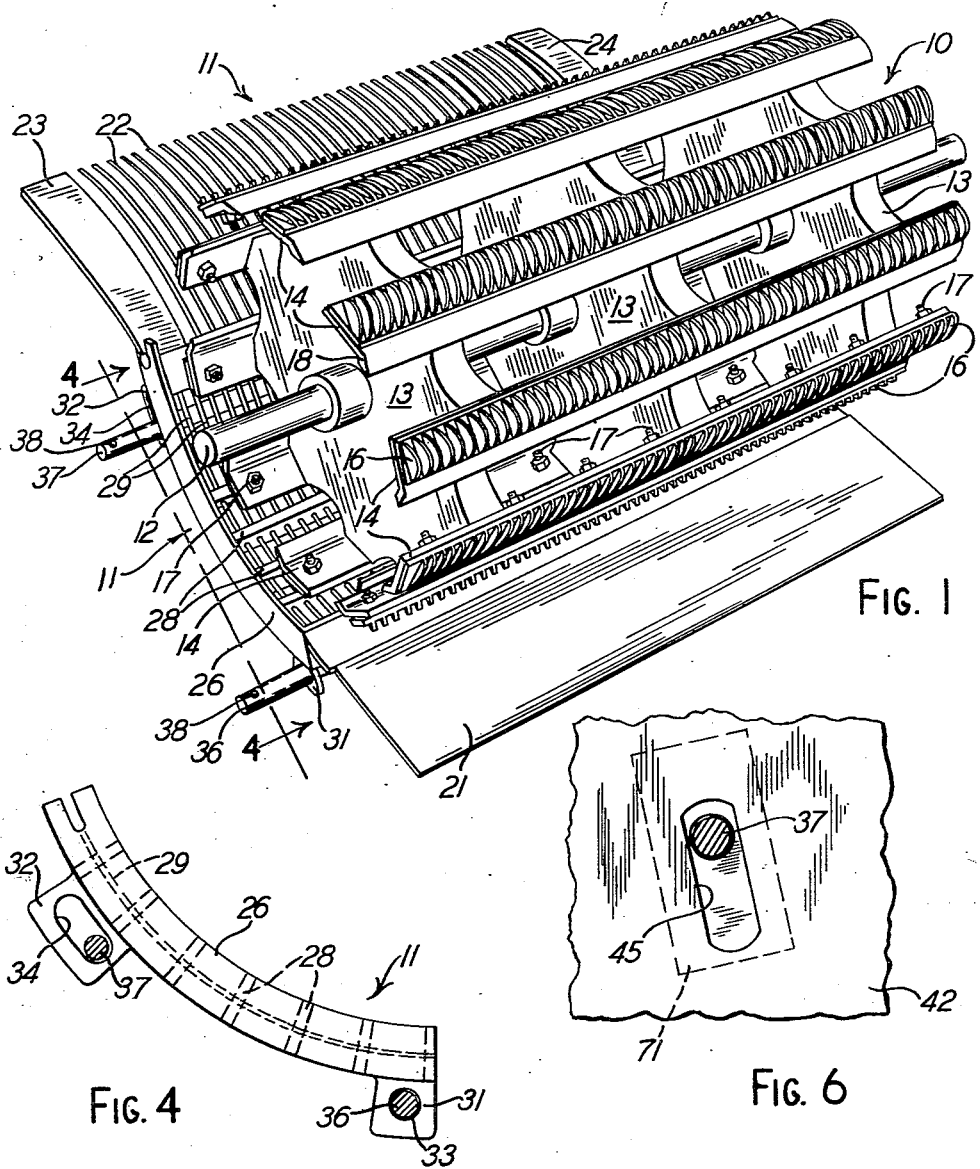
FIG. 1
FIG. 4
FIG. 6
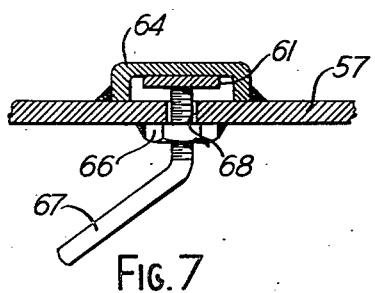
FIG. 7
INVENTOR
SHERMAN C. HETH
BY
AGENT June 4, 1957 S. C. HETH 2,794,438
ADJUSTABLE CONCAVE HAVING SHEAR PIN
Filed June 10, 1954 2 Sheets-Sheet 2
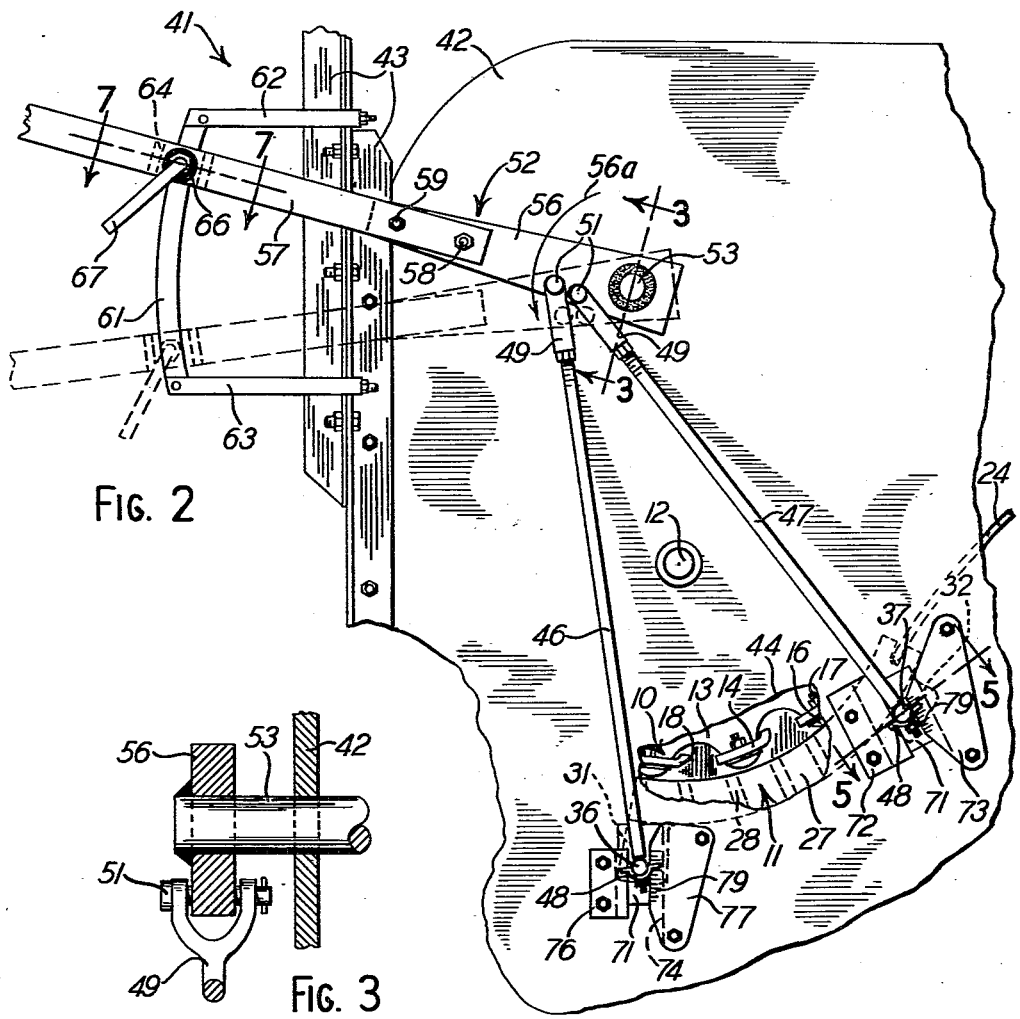
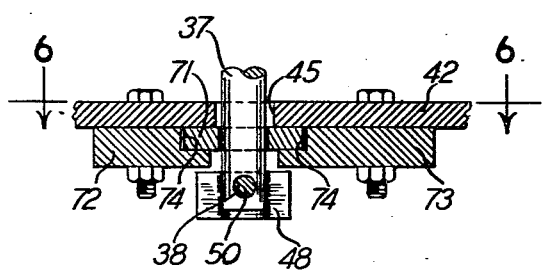
INVENTOR
SHERMAN C. HETH
BY:
AGENT

United States Patent Office

2,794,438
Patented June 4, 1957

2,794,438

ADJUSTABLE CONCAVE HAVING SHEAR PIN

Sherman C. Heth, Racine, Wis., assignor to J. I. Case Company, Racine, Wis., a corporation of Wisconsin Application June 10, 1954, Serial No. 435,781

3 Claims. (Cl. 130—27)

This invention relates to agricultural threshing and combine machines, and particularly, it relates to the concave in said machines.

Heretofore, numerous inventions have been made in the art of mounting and adjusting the concaves of threshing and combine machines. Many of these inventions have for their objects the provisions of a concave which can be adjusted or positioned with respect to the cooperating cylinder by varying the clearance between the concave and the cylinder. Such concave positioning is desirable for the two main reasons of permitting more or different crops to pass through the machine, and to permit foreign objects, such as sticks and stones, to pass through without damaging the machine.

It is an object of this invention to provide a concave and the mounting therefor wherein the concave can be readily and accurately adjusted with respect to the threshing cylinder.

It is a further object of this invention to provide a concave and the mounting therefor wherein the front end and the rear end of the concave can be simultaneously adjusted. This object is preferably accomplished by only one operation which makes an adjustment at both sides of the concave.

Still another object is to provide the subject matter of this invention wherein preliminary concave adjustments can be made to compensate for manufacturing variables; thus, this object permits such variables to exist and eliminates the requirement of close tolerances.

It is a specific object of this invention to provide a concave and the mounting therefor wherein the concave can, in a single operation, be positioned, with respect to the threshing cylinder, to obtain a greater or a lesser amount of clearance between the cylinder and the front of the concave than that obtained between the cylinder and the rear of the concave.

Still another object of this invention is to provide a concave and the mounting therefor wherein a precise concave adjustment is obtainable and can be retained by locking the adjustable concave mounting in the exact desired position.

An additional object is to provide a concave and the mounting therefor wherein the machine is protected against damage by having the concave automatically reelased from its postition with respect to the cylinder if a foreign object, such as a stick or a stone, passes into the machine.

Other objects and advantages include providing an adjustable concave wherein the operator's adjusting handle is conveniently located; and, also, it is deemed to be significant that all of the objects of this invention can be accomplished simply through a modification of presently existing types of threshing and combine machines.

Fig. 1 is a top and side perspective view of a conventional threshing cylinder and a concave of this invention with the concave substantially in operating position with respect to the said cylinder.

Fig. 2 is a side elevational view of the exterior of a fragment of a combine machine having mounted thereon a preferred embodiment of this invention. This view is of the side opposite to that of Fig. 1.

Fig. 3 is an enlarged sectional view taken on the line 3—3 of Fig. 2.

Fig. 4 is a sectional view taken on the line 4—4 of Fig. 1.

Fig. 5 is an enlarged sectional view taken on the line 5—5 of Fig. 2.

Fig. 6 is a sectional view taken on the line 6—6 of Fig. 5.

Fig. 7 is an enlarged sectional view taken on the line 7—7 of Fig. 2.

Similar reference numerals refer to similar parts shown throughout the drawings.

In Fig. 1 there is shown a free body view of a threshing cylinder 10 and a concave 11, with the latter located in substantially its working position with respect to the cylinder 10. For the purpose of clarity of description, the cylinder and the concave of Fig. 1 are not shown mounted in their positions within a combine or threshing machine. However, as will be apparent in the other drawings shown, when viewed in conjunction with the following description, these parts are mounted within said machines. The cylinder 10 is a conventional rasp bar type having a shaft 12 which extends through the center of the cylinder to permit rotation of the latter. It should be understood that while the rasp bar type of cylinder is herein shown, this invention also includes the spike tooth and other types of cylinders and concaves. In the actual mounting of the cylinder in a machine, the shaft is horizontal and is transverse to the direction of flow of the crop. A multiplicity of plates 13 is non-rotatably mounted on the shaft 12 and spaced therealong to project transversely thereto as shown. Suitably attached to the plates 13, to be spaced around the periphery thereof and parallel to the shaft 12, is a multiplicity of support bars 14 which are slightly shorter than the length of the shaft 12. In the cylinder shown, a rasp bar 16 is attached by bolts 17 to each of the support bars 14 to cover an outside length of the bars. During the operation of the cylinder 10, it is rotated in a direction to place angled sides 18 of the support bars 14 in a leading position.

The rasp bars 16 thus scribe a circular path in the rotation of the entire cylinder 10 and that path is generally similar to the arcuate configuration of the concave 11 as shown. A flat feed plate 21 is preferably attached to the front end of the concave 11 to be horizontally disposed to receive and support the crop being processed through the machine. The plate 21 directs the crop between the rotating cylinder 10 and the concave 11 where the grain is threshed loose from the crop in a conventional manner. A plurality of tines 22 are preferably attached to the rear end of the concave 11 and are horizontally spaced apart to form grates through which the threshed grain can drop. Also, the grates are preferably curved downwardly, in a reverse direction with respect to the main part of the concave, to facilitate rearward movement of the crop. Side plates 23 and 24 are also suitably attached to the rear end of the concave to flank the tines 22.

The concave proper is shown to consist of a pair of curved side plates 26 and 27 with a plurality of interconnecting straight cross bars 28 spaced therealong to be horizontally disposed. The side plates and the cross bars are connected by welding or the like to form a unitary structure. In the type of concave shown, it is preferred that a plurality of tines 29 be spaced transverse to the cross bars 28 to be curved the same as the end plates 26 and 27 and to exist therebetween. The tines preferably pass through openings in the cross bars and therefore extend continuously for the length of the concave. In this manner, the tines form grates on the concave, and are disposed in the direction of movement of the crop thereover.

An important feature of this construction is the provision of brackets 31 and 32 attached to the bottom edge of each of the end plates 26 and 27 to be located at the front and rear ends thereof. The brackets contain openings 33 and 34, respectively, as shown in Fig. 4, with the opening 34 preferably being elongated to form a slot while mounting rods 36 and 37 are loosely received within openings 33 and 34, respectively, all for a purpose described later. The rods 36 and 37 extend beyond both sides of the concave and the rods also extend parallel to the cylinder shaft 12. As viewed in Fig. 1, it will be apparent that the ends of each rod are preferably provided with a hole 38 to receive the concave mounting links described later. In this manner, concave front and rear movable or rotatable supports are provided to maintain the concave in position. The side of the construction not shown in Fig. 1 is the same as the side which is apparent in Fig. 1.

Referring to Fig. 2, there is seen a fragment of the exterior of a combine machine 41 having a vertical side plate 42 with a pair of angle irons 43 vertically attached at the front of the combine to form a part of the frame thereof. A section of the plate 42 is shown open at 44 to facilitate showing a selected part of the interior of the combine. In viewing this, it will be obvious that the cylinder 10 and the concave 11 of Fig. 1 are now shown to be mounted within a combine machine. However, these two parts are now shown from a side opposite to that shown in Fig. 1. To further orient the showing of Fig. 2, the end of the cylinder shaft 12 is shown to project outside the plate 42, and the rods 36 and 37 project similarly.

Thus, the cylinder 10 is suitably rotatably mounted within the combine frame while the concave 11 is mounted therebelow as hereinafter described. The concave rods 36 and 37 project outside the side plate 42 through two slots 45 formed in the plate, as shown in Figs. 5 and 6, and the rods are connected, through their end holes 38, with a pair of links 46 and 47, respectively. The connection is preferably as shown with each of the lower ends of the links having a reduced section 50 which is received within the hole 38 and secured by a nut threaded onto each of the ends of the projecting links. It is further preferred that a pointer or bracket 48 be attached to each of the links 46 and 47 by the nuts as shown. This is for a reason which will be apparent later. The upper ends of the links 46 and 47 each have threadedly attached thereto a bifurcated connector 49 which permits adjustment of the length of the links by the latter simply screwing into or out of the connectors. As shown in Figs. 2 and 3, the connectors 49 are each pivotally joined by a pin 51 to an adjusting handle or lever 52. The latter is preferably welded to a shaft 53 which is rotatably mounted in the combine to extend across the width thereof and parallel to the cylinder 10 and the concave 11. Thus, the shaft 53 projects beyond both of the opposite sides of the combine in the same manner that it is shown to project beyond the plate 42.

The lever 52 preferably consists of two aligned members 56 and 57 which are joined to form one extended lever. The members 56 and 57 are maintained together by a bolt 58 and a shear bolt 59. It should be obvious that if the concave 11 is subjected to an excessive force, such as that caused by a foreign object passing between the cylinder and the concave 11, it will cause the shear bolt 59 to be severed and thus allow the concave to fall to a lower position, lever member 56 rotating counter-clockwise about shaft 53 as shown by arrow 56a of Fig. 2, since the latter is supported by the links 46 and 47 and the lever 52. No damage will then be done to the combine and it will be a simple repair to place another shear bolt in position.

The end 57 of the lever 52 projects beyond the combine frame as shown in Fig. 2. A curved quadrant 61 is preferably attached to the frame by horizontal upper and lower arms 62 and 63, respectively, to be disposed on the arcuate path of travel of the lever 52 about the axis of the shaft 53. Also, as shown in Fig. 7, it is preferred to lock the lever 52 in a selected position by means of clamp 64 which is welded to one side of the lever and encloses therewith the quadrant 61. A threaded nut 66 is welded to the opposite side of the lever 52 and provides threads for engaging a threaded rod 67 which passes through the nut and an opening 68 in the lever 52 to abut the quadrant 61 and press it to the clamp 64. With the foregoing described structure, it should be obvious that the concave 11 can be adjusted and secured in a precise position within the range of the quadrant 61.

Referring to Figs. 5 and 6, it will be noticed that the preferred manner of arranging the concave rods 36 and 37 to extend outside the plate 42 includes the provision of the slots 45 in the plates 42. Thus, the rods are free to move along the path defined by the slots which are substantially orientated with the direction of the links 46 and 47. A cover plate 71 is positioned around the projecting ends of each of the rods 36 and 37 to cover the slots 45 at all times and thereby prevent crop from passing outside the combine. The plates 71, therefore, slide up and down with the movement of the rods and the consequent adjustment of the concave. Also, it is preferred that retainer plates 72 and 73 be bolted to the outside of the combine frame to maintain the plate 71 of the rod 37 adjacent said frame while permitting it to slide thereon. For this purpose the plates 72 and 73 are recessed at 74 to receive the plate 71 as shown in Fig. 5. Then the bracket 48 extends beyond the inside edges of the plates 72 and 73 and is, therefore, available to maintain the rod 37 in an axially fixed position so it will project a predetermined distance beyond the side plate 42 of the combine. Similar plates 76 and 77 exist adjacent the rod 36 and likewise maintain that plate 71 in sliding contact with the combine frame.

It should be understood that the combine opposite side, which is not shown, is the same as the side shown and described in relation to the projecting ends of the rods 36 and 37 and the plates therearound. Also, the links 46 and 47 exist on the opposite side of the combine, and a lever, similar to the lever member 56, is provided and is non-rotatably mounted onto the opposite end of the shaft 53 to present a mounting for the links 46 and 47. Then actuation of the lever 52 will rotate the shaft 53 which pivots the two levers 56 attached thereto and moves the two pairs of links 46 and 47 to adjust both sides of the concave.

With this construction, a single concave adjusting lever 52 is required to actuate a pair of links 46 and 47 on each side of the machine and thereby adjust the position of the concave at all four corners thereof. Also, any of the concave four corners can be adjusted individually in elevation by threading the link 36 or 37 with respect to the connector 49 in a preliminary leveling of the concave. Attention is directed to the fact that an extreme actuation of the lever 52, to a position indicated by the dotted line of Fig. 2, will cause the links 46 and 47 to move to the dotted position shown. In this movement, the link 46 is moved more than the link 47 because the latter is mounted nearer to the lever pivot and is at a greater angle to the tangential direction of movement of that link's point of attachment. This permits the desirable feature of providing a greater clearance at the front of the concave, compared to that provided at the rear thereof. Also, when it is so desired, the clearance differential can be reversed with respect to the front and rear of the concave, or it can be made to be equal at both ends of the concave.

In the embodiment shown, a series of spaced markings 79 are etched or otherwise displayed on the plates 73 and 77 adjacent the pointer 48 to form a scale. In this manner the adjustment of the concave, as induced by the movement of the rods 36 and 37, can be accurately determined through the pointer and the scale shown.

The slots 45, located in the sides of the frame, are substantially aligned with the cover plates 71 as shown in Fig. 6. Since the rods 36 and 37 slide within these slots, the actual distance between the rods will vary according to the settings. To accommodate this difference, it is preferred that the previously described concave slot 34, shown in Fig. 4, contain the rod 37 to permit the latter to slide therewithin while vertically supporting that rear end of the concave. Thus, the concave will not be bound in its adjusting movement described above. Also, since the rods are loosely received within the openings 33 and 34, the rods are free to rotate as required by the movement of the links.

While a specific embodiment of this invention has been shown and described, the scope of said invention should be limited only by the appended claims.

I claim:

1. In a concave mounting for an agricultural machine for threshing crops, the combination comprising a concave disposed within said machine and having a front end upon which said crops initially contact said concave and having a rear end for discharging said crops from said concave, a concave front support and a concave rear support connected to said concave to project transversely to the direction of flow of said crops to the exterior of said machine, a first lever portion mounted on said machine and pivoted in a plane transverse to the plane of projection of the concave supports, links separately connecting said first lever portion to the projecting ends of said front support and said rear support with said links attached to said first lever portion at different distances from the pivot thereof, a second lever portion overlapping said first lever portion, said first and second lever portions provided with a pivot member passing through both portions, a shear member spaced from said pivot and extending through said first and second lever portions, and means to secure said second lever portion at the desired adjustment.

2. In an agricultural machine for threshing crops, the combination comprising a threshing cylinder horizontally and rotatably mounted in said machine, a concave disposed in said machine below said cylinder to receive said crops and having a front and rear edge, supports attached to both front and rear edges of said concave, links connected to said supports to extend in a vertical plane therefrom, an actuator connected to said links in a manner whereby operation of said actuator simultaneously adjusts said concave clearance with said cylinder unequally at the front and rear of said concave, said actuator comprising a pair of aligned first and second members pivotally secured together at a point intermediate their ends, and a shear member securing said members in alignment and spaced from said point.

3. In an agricultural machine for threshing crops, having a rotating cylinder and a concave in cooperation therewith, in combination, a pair of front and rear support rods extending transversally of said machine, one rod at the front edge and one rod at the rear edge of said concave and integral therewith, a lever pivoted on a shaft transversely of said machine, comprising a first portion and a second portion secured together in alignment by a pivot means, and a shear member spaced from said pivot and passing through said members, a front link and a rear link attached respectively to said front and rear rods, one end of said links being pivoted in said first portion, said second link pivoted nearer to said pivot shaft than said first link and means to secure said lever in selected positions about said pivot shaft.

References Cited in the file of this patent

UNITED STATES PATENTS

| 2,298,830 | McGillis | Oct. 13, 1942 |

FOREIGN PATENTS

| 98,894 | Sweden | Mar. 14, 1940 |
| 106,043 | Sweden | Oct. 1, 1942 |
| 106,466 | Sweden | Dec. 3, 1942 |